(No Model.)

F. J. REINHOLD.
CAPSULE MACHINE.

No. 323,886. Patented Aug. 4, 1885.

WITNESSES
Henschel Whitaker
Charles B. Lothrop

INVENTOR
Frank J. Reinhold
by Geo. H. Lothrop,
Atty.

UNITED STATES PATENT OFFICE.

FRANK J. REINHOLD, OF DETROIT, MICHIGAN, ASSIGNOR TO FREDERICK A. HUBEL, OF SAME PLACE.

CAPSULE-MACHINE.

SPECIFICATION forming part of Letters Patent No. 323,886, dated August 4, 1885.

Application filed May 20, 1885. (No model.)

*To all whom it may concern:*

Be it known that I, FRANK J. REINHOLD, of Detroit, in the county of Wayne and State of Michigan, have invented a new and useful Improvement in Devices for Stirring Melted Gelatine, of which the following is a specification.

My invention consists in an improved device for stirring melted gelatine for molding gelatine capsules, hereinafter fully pointed out in the claims. The principle of its operation is the same as that of the device patented in Letters Patent No. 316,896—viz., maintaining a steady current of melted gelatine through the dipping-dish.

Figure 1:
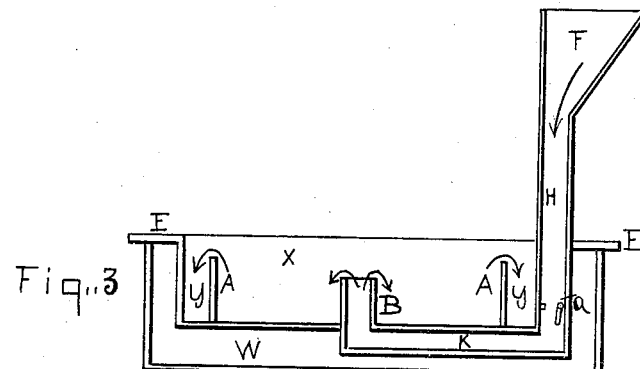
Figure 1:
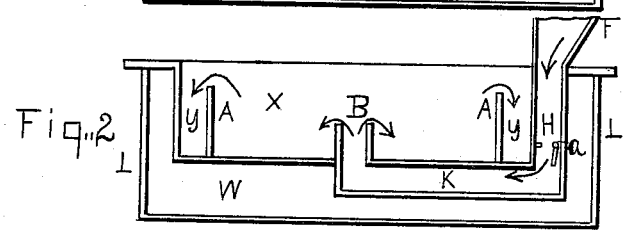
Figure 1:
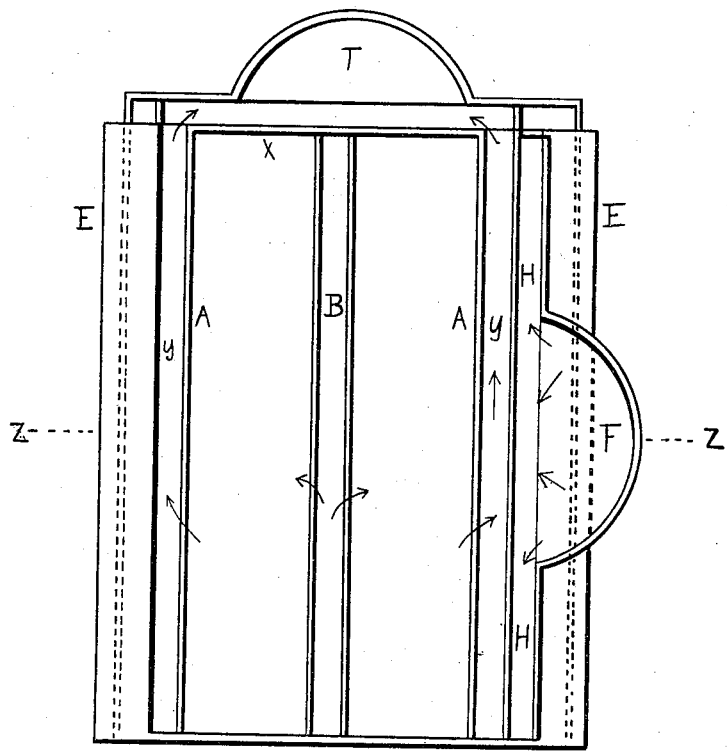

Figure 1 is a plan view, and Figs. 2 and 3 are vertical sections on the line $zz$, Fig. 1, differing only in the relative heights of the dipping and supply dishes.

X represents a dipping-dish adapted to hold melted gelatine and of proper size to receive a plate of mold-pins.

W represents an inclosing-dish, adapted to hold water, to the bottom of which heat is applied to melt the gelatine through the medium of a water-bath, and its walls L support dish X by means of the flanges E.

Y represents an overflow dish or trough, formed on each side of the dipping-dish X and at one end thereof, the walls A, which form the sides of the dipping-dish X, forming two sides thereof, and the dish or trough Y being preferably extended at one end of the dipping-dish to form a receptacle, T, into which the melted gelatine will flow, and from which it can be removed by a ladle or any suitable lifting or pumping mechanism.

The dish or trough Y may be of any desired form or dimensions, its only office being to catch and hold the melted gelatine which flows over the walls A in the use of the device.

In the bottom of the dipping-dish X is an opening, B, which I prefer to make the whole length of the dish, as shown in Fig. 1. This opening B may be simply a hole cut through the bottom of dish X, or it may be in the form of a flat pipe, extending nearly to the top of the dipping-dish, as shown in Figs. 2 and 3, and I prefer to make it in this way, as it makes the current of gelatine through the dipping-dish principally on the surface of the gelatine therein, where change is most necessary, as the surface of the gelatine is the part which becomes chilled by exposure to the air.

F represents a supply-dish, elevated above the level of dish X, and the bottom of the supply-dish is connected with the opening B in the bottom of the dipping-dish by a pipe, H K, which I prefer to make the whole length of the dipping-dish, as shown in Fig. 1, as this distributes the melted gelatine which flows through said pipe more thoroughly to all parts of the dipping-dish than would a small round pipe; but this pipe may be made of less dimensions, if desired. In this pipe I sometimes put a swinging valve, $a$, by which I can regulate the amount of melted gelatine which will flow through said pipe; but this may be dispensed with by making the pipe sufficiently small in its lesser diameter. Valve $a$ may be operated by a cord or crank or in any other suitable manner.

By keeping a constant supply of melted gelatine in the supply-dish F a steady current of gelatine will flow through pipe H K into and through the dipping-dish, and thus the gelatine in the dipping-dish will be constantly stirred in such manner that no air-bubbles will be formed therein. The overflow will be caught in dish Y, and can be restored to dish F in any suitable manner.

The form, size, and arrangement of the parts which I have shown can be changed without departing from my invention so long as the supply-dish is placed above the dipping-dish, the bottoms of the two dishes are connected, and an overflow-dish is placed in position to catch the overflow from the dipping-dish.

What I claim as my invention, and desire to secure by Letters Patent, is—

1. In a device for stirring gelatine for molding gelatine capsules, the combination of a dipping-dish, X, an overflow-dish, Y, an inclosing water-dish, W, and a supply-dish, F, located at a higher level than the dipping-dish, and connected with the bottom of the latter through pipes H K, substantially as described.

2. In a device for stirring melted gelatine for molding gelatine capsules, the combination of the dipping-dish X, the overflow-dish Y, the supply-dish F, and the pipe H K, having therein the valve $a$ and means for operating the same, substantially as shown and described.

FRANK J. REINHOLD.

Witnesses:
CHARLES B. LOTHROP,
GEO. H. LOTHROP.